April 20, 1965   J. W. JACOBS   3,179,116
SELF CLEANING VARIABLE FILTER FOR A DISHWASHER
Filed Sept. 22, 1961
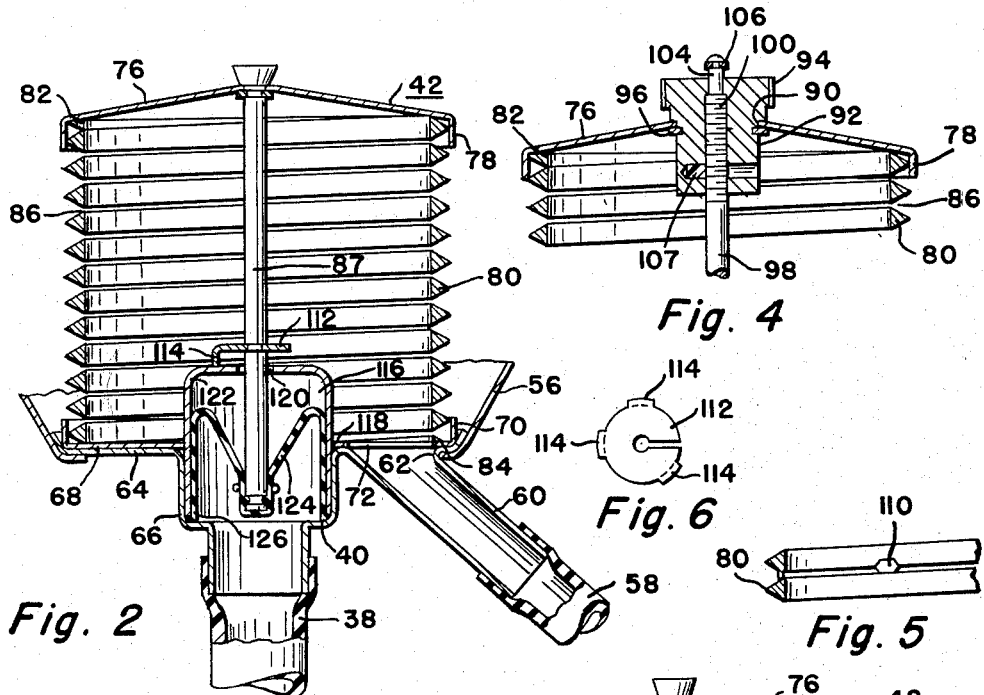
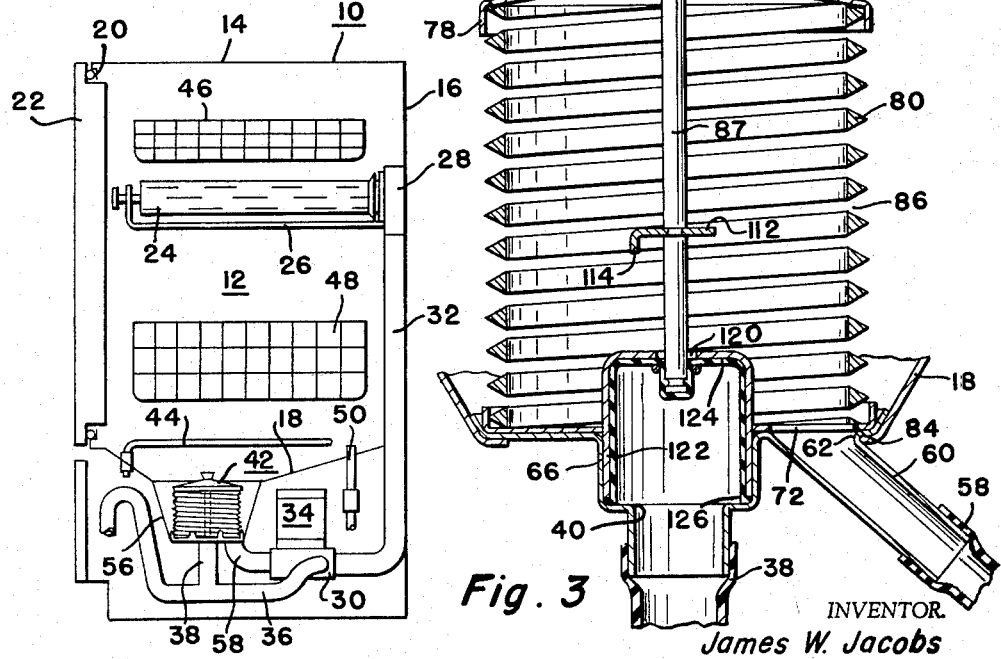
INVENTOR.
James W. Jacobs
BY Frederick M. Ritchie
His Attorney

United States Patent Office

3,179,116
Patented Apr. 20, 1965

3,179,116
SELF CLEANING VARIABLE FILTER FOR A DISHWASHER
James W. Jacobs, Dayton, Ohio, assignor to General Motors Corporation, Detroit, Mich., a corporation of Delaware
Filed Sept. 22, 1961, Ser. No. 140,002
4 Claims. (Cl. 134—56)

This invention relates to a domestic appliance and more particularly to an improved variable filter for a dishwasher.

The dishwashing art has long sought a filter which would be self cleaning and which would resist soil build-up on the surface thereof over extended periods of usage.

Accordingly it is an object of this invention to provide a filter having filtering openings which may be varied in size to selectively restrict and filter soil.

A further object of this invention is the provision of a filter comprised of a helical spring in blocking relationship to the inlet of a dishwasher pump, the operation of which pump positions the convolutions of the spring in a manner to selectively restrict flow to said pump.

Further objects and advantages of the present invention will be apparent from the following description, reference being had to the accompanying drawings wherein preferred embodiments of the present invention are clearly shown.

In the drawings:

FIGURE 1 is a generally side sectional schematic view of a dishwasher provided with this invention;

FIGURE 2 is a sectional view of the helical spring filter of this invention in its filtering position;

FIGURE 3 is a sectional view of a helical spring filter in its self cleaning position;

FIGURE 4 is a detail view of a filter opening adjusting feature suitable for use with this invention;

FIGURE 5 is another embodiment of the filter spring with means for securing minimum spacing in the spring; and FIGURE 6 is a top elevational view of a snap ring spider used with one embodiment of this invention.

In accordance with this invention and with reference to FIGURE 1 a dishwasher 10 is illustrated. The dishwasher 10 is comprised of a casing forming a dishwashing chamber 12 and having a top wall 14, a back wall 16, and a bottom wall 18. The dishwashing chamber has a front opening 20 which is closed by a horizontally hingedly mounted door 22. The spray tube or spray device 24 is rotatably mounted at its front end on a rod support 26 in the dishwashing chamber 12 and is rotatably retained at the rear wall of the dishwashing chamber 12 on a swirl producing header 28. A pump 30 of the type taught in the copending application Serial No. 792,158 filed February 9, 1959, now Patent No. 3,082,779, and assigned to the same assignee as this invention, is connected to the swirl header 28 by a supply conduit 32. The pump 30 may be driven by a reversible motor 34 which is adapted, when reversed, to cause the pump to direct water to a drain or sewer through a reduced diameter waste conduit 36. Note that the difference in size of conduits 32 and 36 permit the pump 30 to recirculate approximately 35 gallons per minute to the spray tube 24, whereas approximately 9 gallons per minute is directed to drain when the pump is reversed. This flow differential produces pressure changes in a filter actuating conduit or passageway 38 which is connected to the waste conduit 36 at its lower end and to a filter actuating opening 40 in the bottom wall of the dishwashing chamber sump. The variable pressures reflected in the conduit 38 are used to operate a filter 42 as will be described more fully hereinafter.

In accordance with conventional practice a heater 44 may be disposed in the sump for heating the recirculating fluid throughout the dishwashing cycle. Also conventional is the slidable positioning of the support baskets such as 46, 48 on opposite sides of the spray tube 24 to expose the dishes to the maximum effects of the swirling spray in the dishwashing chamber 12. Water may be admitted to the sump through a solenoid actuated supply pipe 50.

The effectiveness of the dishwashing cycle depends in large measure on the system filtering means for removing the soil from the recirculating water. If soil is recirculated, it generally ends up on the surfaces of the dishes being washed and the washing results are unsatisfactory. In prior art dishwashers which use a filter in the recirculating water system, it has been found that stringy soil becomes entwined around the interstices of the various filtering elements and, after a period of time, essentially negates the value of the filter element. This invention proposes to replace the perforated type of filter with a variably sized annular slot device formed by the spacing between adjacent convolutions of a helical spring.

More particularly and with reference to FIGURE 2, the bottom wall 18 includes a recessed well or sump 56 which cradles the filter 42 in a position where it will intercept all fluid flowing toward the pump 30 through a pump inlet conduit 58. To accommodate the pump inlet conduit the sump 56 is formed with a sump outlet stub 60 extending from a sump outlet 62. The sump outlet stub 60 is formed in a bottom panel 64 of the sump along with a recessed socket 66 to which the drain pressure reflecting conduit 38 is attached.

The filter 42 is comprised of a lower circular support panel 68 having an upturned annular flange 70 substantially the same diameter as the sump bottom panel 64. In the bottom support panel 68 is a filter outlet opening 72 which is axially in line with the opening 62 in the bottom wall of the sump. Spaced from the lower circular panel 68 is a generally imperforate upper panel 76 of substantially the same diameter as the lower support panel 68 and having a down turned annular flange 78 immediately above the flange 70 below. Interposed between the upper panel 76 and the lower panel 68 is a helical spring 80, the convolutions of which are triangular in cross section as shown in FIGURE 2. The top convolution 82 is fastened as by welding adjacent the periphery of the upper support panel 76 while the lowermost convolution 84 is welded in similar fashion to the lower support panel 68 outboard of the outlet opening 72. Since the upper panel 76 is imperforate and the spring is fastened at its opposite ends to both the upper panel and lower panel, it can be seen that fluid flow from the radially outer side of the helical spring 80 to the radially inner side will cause a filtering of the fluid depending on the spacing 86 between adjacent convolutions of the spring. Although FIGURES 2 and 3 show a filter with fixed spacing depending on the length of a spring support rod 87, it should be recognized that by adjusting the spacing 86 the extent of filtering is controllable. One method of adjusting the spacing between adjacent spring convolutions will be explained next following.

The adjustment of the spacing between adjacent convolutions is made possible by an embodiment shown fragmentarily in FIGURE 4. The upper support panel 76 is formed with a central opening 90 which slips over a shank portion 92 of a knurled adjustment knob 94. A snap ring 96, interfitting with the shank 92, provides a relatively rotatable connection between the panel 76 and the adjusting knob 94. A shaft 98 has a threaded portion 100 which screws into the knob 94 and has a reduced diameter stub 104 integral therewith and extending through the top of the adjustment knob for retaining the knob on the rod as by a snap ring 106. When the knob 94 is turned relative to the panel 76 and the rod 98, the spacing between the spring convolutions is varied. The minimum spacing 86 is determined when the top of the threaded portion 100 hits the bottom of the tapped hole in the knob 94 as shown in FIGURE 4. On the other hand, the maximum spacing 86 is governed by the length of the shaft stub 104, i.e., when the knob 94 is unscrewed from the shaft 98 until its top hits the snap ring 106. In this position the spring 80 will serve to filter only large particles from the fluid circulating therethrough. Any suitable means may be provided between the shaft 98 and the knurled adjustment knob 94 to resist a change in filter position due to vibration in the dishwasher. One satisfactory device is a nylon friction plug 107 between the threads of the shaft and the adjustment knob. Another method is to provide a slightly different number of threads on either the shaft or the tapped hole in the knob, thereby setting up an interference which will resist movement due to vibration.

Another method of predetermining the minimum spacing between adjacent convolutions is shown in FIGURE 2 wherein a spider-shaped C-clamp 112 is snap-fit on an annular groove in the shaft 87. The down-turned feet 114 of the spider will rest on any suitable portion 116 fixed relative to the bottom 68 of the filter to determine the minimum spacing between convolutions.

The foregoing methods of adjustment locate the upper and lower panels 68, 76 and rely on the stiffness of the spring to maintain equal spacing between all of the spring convolutions. A more positive method of adjusting the minimum spacing between adjacent convolutions is seen in FIGURE 5 wherein spaced coined depressions 110 are formed about the convolutions of the spring. The size of the depending protuberance 110 will determine the spacing between the convolutions.

The manner of operating the filter 42 will now be described with reference to FIGURES 2 and 3. Note that an inverted cup-shaped housing 116 is attached as at 118 to an opening in the lower support wall 68 of the filter. The housing has an opening 120 to receive the adjustment shaft 87 and forms a cylinder 122 for receiving a bellofram piston or diaphragm 124 having its periphery connected at 126 to the lower end of the cylinder 122, thereby sealing the open end of the cylinder. Note that the cylinder is exposed on the lower side to the drain pressure reflecting conduit 38. Only the diaphragm 124 separates the inside of the filter 42 from the pressure conduit 38. Pressure differential between the conduit 38 and the bottom of the sump controls the movement of the diaphragm 124 which is connected to the adjustment shaft 87. When the pump is operating to recirculate fluid to the dishwashing chamber, the diaphragm 124 assumes a depressed position shown in FIGURE 2 and the minimum spacing between convolutions is determined by the seating of the spider feet 114 on the top wall of the cylinder housing 116. During this period water being drawn to the pump 38 through the pump inlet conduit 58 will be filtered in accordance with the spacing between the spring convolutions.

When the pump 30 is reversed to direct water to drain, the pressure occurring due to the flow of water in the conduit 36 will be reflected through the conduit 38 at the diaphragm 124 which will then assume a raised position seen in FIGURE 3. As the diaphragm is forced upwardly the adjustment shaft 87 will lift the top support panels 76 of the filter and spread the convolutions of the spring 80. As the convolutions are spread, the soil is released from between the convolutions (the triangular cross section of the spring aiding in this release) and the soil contaminated water directed to drain. Although the foregoing filter has been made responsive to an automatically operated diaphragm, it should be recognized that a solenoid could be used to raise and lower the shaft 87 at appropriate times during a dishwashing cycle.

It should now be seen that a novel helical spring filter having improved self cleaning characteristics has been provided for a dishwasher and made responsive to pump operation so that the filter will be cleaned during a draining operation.

While the embodiments of the present invention as herein disclosed constitute preferred forms, it is to be understood that other forms might be adopted.

What is claimed is as follows:

1. In combination with a dishwashing machine including walls enclosing a dishwashing chamber, one of said walls being formed to provide a sump having first and second openings, means for supplying fluid to said sump, a pump having its inlet connected to said second opening, first conduit means selectively connected to receive the output of said pump for returning said fluid to said dishwashing chamber, second conduit means selectively connected to receive the output of said pump for directing said fluid to drain, third conduit means interconnecting said first opening in said sump and said second conduit, a piston in said third conduit responsive to the pressure in said second conduit and adapted to move in one direction when the pressure in said third conduit is high and to move in another direction when the pressure in said third conduit is low, and a removable filter in said sump for covering said openings, said filter comprising a first support plate having an outlet opening in communication with said second opening, a second support plate in spaced parallel relationship to said first support plate, a helical spring interposed between said support plates and having its opposite ends connected respectively to said support plates, one end of said spring connected to said first support plate radially outwardly of said outlet opening, and filter control means fixed relative to one of said support plates and movable relative to the other of said support plates to vary the distance between said support plates and thereby the spacing between adjacent convolutions of said helical spring, said filter control means connected to said piston and moved thereby for filtering soil from said fluid when said piston positions said control means to effect a relatively small spacing between said adjacent convolutions of said spring and for cleaning said soil from said filter when said piston positions said control means to effect a relatively large spacing between said adjacent convolutions of said spring as said fluid passes from the radially outer side of said spring to said outlet opening on the way to said pump, and means for selectively operating said pump to connect one of said first or second conduits to receive said pump output.

2. In combination with apparatus including walls enclosing a washing chamber, one of said walls being formed to provide a sump having a first and second opening, means for supplying fluid to said sump, a pump having its inlet connected to said second opening, first conduit means selectively connected to receive the output of said pump for returning said fluid to said washing chamber, second conduit means selectively connected to receive the output of said pump for directing said fluid to drain, third conduit means interconnecting said first opening in said sump and said second conduit, means responsive to the pressure in said third conduit means and adapted to move in one direction when the pressure in said third conduit is high and to move in another direction when the pressure in said third conduit means is low, and an accordian-like filter in said sump overlying siad openings, said filter comprising a first support plate having an outlet opening in communication with said second opening, a second support plate in spaced parallel relationship to said first support plate, a helical spring interposed between said support plates and having its opposite ends connected respectively to said support plates, one end of said spring connected to said first support plate radially outwardly of said outlet opening, and filter control means fixed relative to one of said support plates and movable relative to the other of said support plates to vary the distance between said support plates and thereby the spacing between adjacent convolutions of said helical spring, said filter control means connected to said pressure responsive means for filtering soil from said fluid when said pressure responsive means positions said control means to effect a first spacing between said adjacent convolutions of said spring and for cleaning said soil from said filter when said pressure responsive means positions said control means to effect a second spacing between said adjacent convolutions of said spring as said fluid passes from the radially outer side of said spring to said outlet opening on the way to said pump, and means for selectively connecting said first or second conduit means to receive the output of said pump.

3. In combination with a washing machine including walls enclosing a washing chamber, one of said walls being formed to provide a sump having a sump opening, means for supplying fluid to said sump, a pump having its inlet connected to said sump opening, first conduit means selectively connected to receive the output of said pump for returning said fluid to said washing chamber, second conduit means selectively connected to receive the output of said pump for directing said fluid to drain, and a filter in said sump for covering said sump opening, said filter comprising a first support plate having an outlet opening in communication with said sump opening, a second support plate in spaced parallel relationship to said first support plate, a helical spring interposed between said support plates and having its opposite ends connected respectively to said support plates, one end of said spring connected to said first support plate radially outwardly of said outlet opening, and control means connected to one of said support plates and movable relative to the other of said support plates to vary the distance between said support plates and thereby the spacing between adjacent convolutions of said helical spring, said control means positioning said one of said support plates in a first position relative to said other of said support plates to effect a first spacing between said adjacent convolutions of said spring for filtering said soil from said fluid as said fluid passes from the radially outer side of said spring to said outlet opening when said first conduit is connected to receive the output of said pump, and said control means positioning said one of said support plates in a second position relative to said other of said support plates to effect a second spacing between said adjacent convolutions of said spring for cleaning said soil from said filter as said fluid passes from the radially outer side of said spring to said outlet opening when said second conduit is connected to receive the output of said pump, said control means including means responsive to the pressure in said second conduit means.

4. The combination of claim 3 including means for adjusting the spacing when said one of said support plates is in either said first or second position.

References Cited by the Examiner

UNITED STATES PATENTS

| | | | |
|---|---|---|---|
| 2,068,282 | 1/37 | Strindberg | 210—497.1 X |
| 2,342,669 | 2/44 | Hoffman | 210—497.1 X |
| 2,621,505 | 12/52 | Smith | 68—18.1 X |
| 2,808,063 | 10/57 | Abresch et al. | 134—186 X |
| 3,129,711 | 4/64 | Schmitt-Matzen | |

CHARLES A. WILLMUTH, *Primary Examiner.*

T. H. MARTIN, *Examiner.*